United States Patent
Kirschner

(12) United States Patent
(75) Inventor: Kraig A. Kirschner, Corona, CA (US)
(73) Assignee: Automatic Fire Control, Incorporated, South El Monte, CA (US)
(*) Notice: Subject to any disclaimer, the term of this patent is extended or adjusted under 35 U.S.C. 154(b) by 44 days.

(10) Patent No.: US 6,898,905 B1
(45) Date of Patent: May 31, 2005

(54) OFFSET BEAM CLAMP

(21) Appl. No.: 10/190,887
(22) Filed: Jul. 2, 2002
(51) Int. Cl.[7] .............................. E04B 1/38; F16L 2/02
(52) U.S. Cl. .................... 52/127.5; 52/703; 52/299; 248/72; 248/228.5
(58) Field of Search ............................... 52/299, 126.2, 52/126.7, 143, 489.1, 169.12, 127.2, 127.5, 52/702–703; 248/228.1, 72, 228.5, 235

(56) References Cited

U.S. PATENT DOCUMENTS

| | | | | |
|---|---|---|---|---|
| 1,245,047 A | * | 10/1917 | Sherman | 248/72 |
| 1,489,474 A | * | 4/1924 | Beckwith | 52/489.1 |
| 1,778,700 A | * | 10/1930 | Whittier et al. | 248/72 |
| 2,470,991 A | * | 5/1949 | Kindorf et al. | 248/72 |
| 2,996,570 A | * | 8/1961 | Wilson | 174/163 F |
| 3,126,182 A | * | 3/1964 | Stamper | 248/72 |
| 3,140,848 A | * | 7/1964 | Sherburne | 248/72 |
| 3,874,035 A | * | 4/1975 | Schuplin | 248/72 |
| 3,993,279 A | * | 11/1976 | Holt | 248/235 |
| 4,379,651 A | * | 4/1983 | Nagashima | 403/387 |
| 4,570,885 A | * | 2/1986 | Heath | 248/72 |
| 5,240,423 A | * | 8/1993 | Morrison | 439/92 |
| 5,518,085 A | * | 5/1996 | Houser et al. | 184/3.1 |
| 5,740,994 A | * | 4/1998 | Laughlin | 248/68.1 |
| 5,947,424 A | * | 9/1999 | Heath | 248/58 |
| 6,334,285 B1 | * | 1/2002 | Kirschner | 52/702 |
| 6,520,705 B2 | * | 2/2003 | Stasney, Jr. | 403/258 |

FOREIGN PATENT DOCUMENTS

GB 2030207 * 8/1978

* cited by examiner

Primary Examiner—Winnie Yip
(74) Attorney, Agent, or Firm—Fulbright & Jaworski L.L.P.

(57) ABSTRACT

An offset beam clamp having a deep channel including two legs, a hole in the channel bottom, and a slot having two sides and a slot bottom and extending transversely through the legs. The slot receives the first of two angle iron members that comprise the upper cord of a web joist. A J-bolt is anchored to the second angle iron member and extends through the hole in the channel bottom where an angle bracket is secured on the bolt. A threaded mounting shaft is attached to the angle bracket.

7 Claims, 1 Drawing Sheet

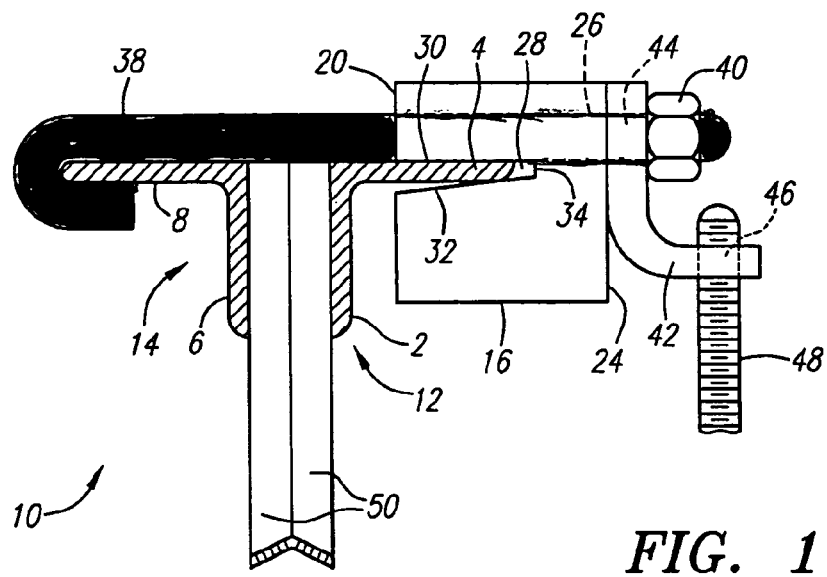
FIG. 1
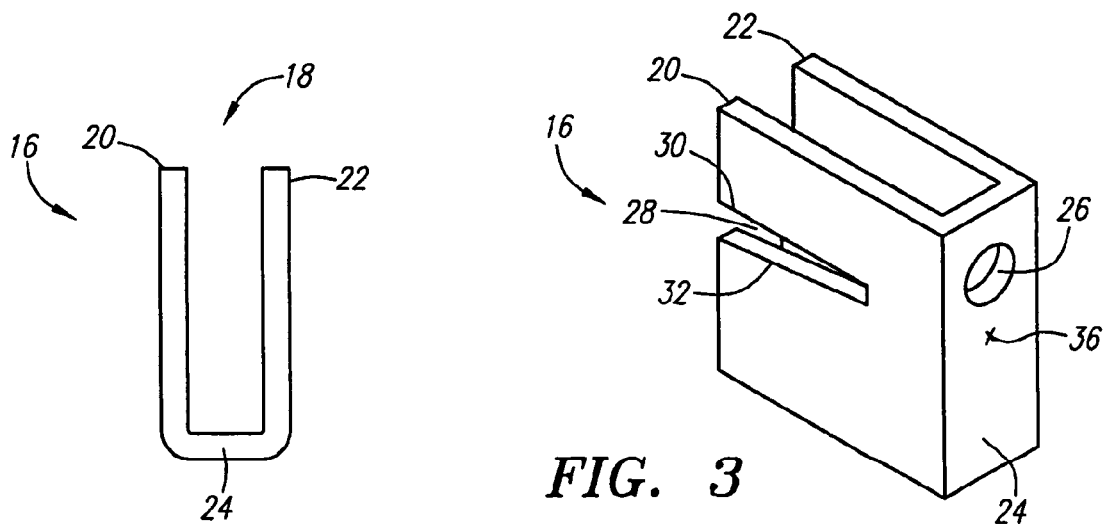
FIG. 2
FIG. 3
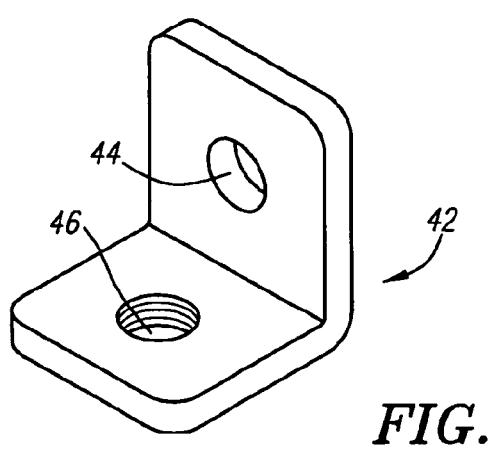
FIG. 4

OFFSET BEAM CLAMP

BACKGROUND OF THE INVENTION

The field of the present invention is building construction hardware for mounting components such as utilities.

Building construction frequently uses steel web joists. Such devices employ two beams. The beams are mutually parallel and spaced apart to create a large moment of inertia for the joist. Cord elements extend at angles between the two so the beams will act as one in bending. Each beam includes a set of two elongated angle elements, or angle iron members, which are also mutually parallel. The cord elements extend for anchoring to between the elongated angle elements which form a cord space to receive the elements. Each angle element includes two legs extending at a right angle to one another, a first leg which is parallel with the first leg of the other angle element to define the cord space and a second leg extending in the opposite direction from the second leg of the other angle element to generally define a plane. The two first legs extend to define parallel edges at the distal ends of two parallel webs.

Building structures frequently require the mounting of conduit, pipe, and miscellaneous architectural, decorative and mechanical devices thereto. To do so, a wide variety of brackets and other hardware have been developed. Such hardware is frequently, if not universally the subject of building code requirements, UL specifications and the like.

SUMMARY OF THE INVENTION

The present invention is directed to an offset beam clamp for attachment to the upper cord of a steel web joist. The clamp contains a deep channel defined by two legs and a channel bottom, a hole in the channel bottom, and a slot having two sides and a slot bottom and extending transversely through the legs. The slot receives a leg of an angle iron member. The slot bottom is spaced from the channel bottom and as a result, items attached on the side of the channel bottom opposite the slot are offset from the steel web joist.

Accordingly, it is an object of the present invention to enable offset mountings to steel web joists. Other and further objects and advantages will appear hereinafter.

BRIEF DESCRIPTION OF THE DRAWINGS

FIG. 1 shows a threaded mounting shaft attached to a steel web joist by use of a J-bolt, an offset beam clamp, an angle bracket, and a nut.

FIG. 2 is a top view of the offset beam clamp shown in FIG. 1.

FIG. 3 is a back perspective view of the offset beam clamp shown in FIG. 1.

FIG. 4 is a front perspective view of the angle bracket shown in FIG. 1.

DETAILED DESCRIPTION OF THE PREFERRED EMBODIMENTS

Turning in detail to the drawings, FIG. 1 illustrates the top cord of a steel web joist 10 having two angle iron members 12 and 14. Each of the two angle iron members includes two legs 2, 4 and 6, 8, respectively. The two legs 2, 4 of the first angle iron member 12 extend at right angles to each other, as do the two legs 6, 8 of the second angle iron member 14. The first legs of each angle iron member 2, 6 are mutually parallel and separated to define a cord space within which the web elements 50 are anchored. The second leg 4 of the first angle iron member 12 extends in the opposite direction from the second leg 8 of the second angle iron member 14 to generally define a plane. The legs of the angle iron members are typically ³⁄₁₆ inch to ⅜ inch in thickness, though legs of other thickness may be found in the art.

FIGS. 1–3 illustrate an offset beam clamp 16. The offset beam clamp 16 is preferably made of a single plate of carbon steel which may be unfinished, electro-galvanized, or hot dip galvanized. Other coatings may be applied as desired.

The offset beam clamp 16 contains a deep channel 18 including two legs 20, 22, a channel bottom 24 between the two legs, a hole 26 in the channel bottom, and a slot 28 extending transversely through the legs, having a first side 30, a second side 32, which may be at an angle with respect to the first side 30 to define a tapered slot 28, and a slot bottom 34 spaced from the channel bottom 24.

The hole 26 is preferably offset longitudinally of the midpoint of the channel bottom 36, the center of the hole 26 being located a distance above where the plane containing the first side of the slot 30 intersects the channel bottom 24; said distance substantially equaling slightly more than one half of the diameter of the hole 26. In this way, the first side of the slot 30 lies in a plane substantially tangentially aligned with the hole 26. Although a round hole is disclosed, holes of different shapes may be used. The hole 26 is preferably slightly larger than ½ inch in diameter so as to accommodate a ½-inch bolt. However, many different sizes of bolts and holes may be used.

A J-bolt 38 is anchored to the second angle iron member 14 as shown in FIG. 1. The J-bolt is typically ½ inch in diameter, although other sizes may be used as well. While a J-bolt is disclosed, those skilled in the art will recognize that other types of bolts capable of being anchored to angle iron members may also be used. The J-bolt 38 extends through the hole 26 in the channel bottom 24 and is threadably engaged with a nut 40. An angle bracket 42, having a mounting hole 44 on one end and a threaded hole 46 on the other end, is positioned on the J-bolt 38 between the offset beam clamp 16 and the nut 40 such that the J-bolt passes through the mounting hole 44 of the angle bracket 42. A threaded mounting shaft 48 is engaged with the threaded hole 46 in the angle bracket 42. The threaded mounting shaft 48 is attached to various types of hanging apparatuses that are well known in the art, thus enabling various items such as conduit, pipe, and miscellaneous architectural, decorative and mechanical devices to be attached to the steel web joist 10.

As the nut 40 is tightened, the second leg 4 of the first angle iron member 12 is secured within the slot 28 of the offset beam clamp 16. In addition, the angle bracket 42 is secured between the nut 40 and the channel bottom 24, providing a relatively rigid, strong, and stable means for attaching the threaded mounting shaft 48 to the steel web joist 10. The threaded mounting shaft 48 is offset from the web elements 50 of the steel web joist 10 such that when a large diameter pipe, for example, is attached to the threaded mounting shaft 48, the pipe will be spaced away from the web elements.

Thus an offset beam clamp is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An offset beam clamp for attachment to an upper plate of a beam having parallel edges, comprising
   - a deep channel including two legs, a channel bottom between the legs, a hole in the channel bottom and a tapered slot having two sides and a slot bottom, the slot extending transversely through the legs and capable of receiving one of the parallel edges partially therein, a first side of the slot lying in a plane being substantially tangentially aligned with the hole and the slot bottom being spaced from the channel bottom;
   - a bolt having an anchor at one end capable of engaging the other of the parallel edges and threads at the other end extendable through the hole;
   - a nut engageable with the threads of the bolt.

2. The offset beam clamp of claim 1, the hole being offset longitudinally of the midpoint of the channel.

3. The offset beam clamp of claim 1, further comprising an angle bracket having a mounting hole at one end and a threaded hole at the other, the mounting hole of the angle bracket being positionable on the bolt between the nut and the channel with the bolt through the hole and the nut on the second end of the bolt.

4. The offset beam clamp of claim 3 further comprising a threaded mounting shaft engageable with the threaded hole of the angle bracket.

5. An offset beam clamp for attachment to an upper plate of a beam having parallel edges, comprising
   - a deep channel including two legs, a channel bottom between the legs, a hole in the channel bottom and a tapered slot having two sides and a slot bottom, the slot extending transversely through the legs and capable of receiving one of the parallel edges partially therein, a first side of the slot lying in a plane being substantially tangentially aligned with the hole and the slot bottom being spaced from the channel bottom;
   - a J-bolt engageable with the other of the parallel edges and extendible through the hole;
   - a nut engaged with the bolt;
   - an angle bracket having a mounting hole at one end and a threaded hole at the other, the mounting hole of the angle bracket being on the bolt between the nut and the channel.

6. The offset beam clamp of claim 5 further comprising a threaded mounting shaft engaged with the threaded hole of the angle bracket.

7. The offset beam clamp of claim 1, the bolt being a J-bolt.

* * * * *